United States Patent [19]

Holmes et al.

[11] Patent Number: 4,807,256

[45] Date of Patent: Feb. 21, 1989

[54] GLOBAL POSITION SYSTEM RECEIVER

[75] Inventors: Jerry D. Holmes, Dallas; Hatcher E. Chalkley, Carrollton, both of Tex.

[73] Assignee: Texas Instruments Incorporated, Dallas, Tex.

[21] Appl. No.: 811,984

[22] Filed: Dec. 23, 1985

[51] Int. Cl.[4] .............................. H04L 27/06
[52] U.S. Cl. ............................ 375/97; 375/1; 342/357
[58] Field of Search ............. 375/1, 97, 114, 115; 343/352, 357, 396; 364/446, 458; 370/104

[56] References Cited

U.S. PATENT DOCUMENTS

| 3,947,634 | 3/1976 | Betts | 375/115 |
|---|---|---|---|
| 4,221,005 | 9/1980 | La Flame | 375/1 |
| 4,361,891 | 11/1982 | Lobenstein et al. | 375/1 |
| 4,468,793 | 8/1984 | Johnson et al. | 375/97 |
| 4,485,383 | 11/1984 | Maher | 343/352 |
| 4,532,635 | 7/1985 | Mangulis | 375/115 |
| 4,561,089 | 12/1985 | Rouse et al. | 375/115 |
| 4,587,661 | 5/1986 | Schiff | 375/1 |

Primary Examiner—Robert L. Griffin
Assistant Examiner—Stephen Chin
Attorney, Agent, or Firm—René Grossman; Leo N. Heiting; Melvin Sharp

[57] ABSTRACT

A Global Position System (GPS) receiver is disclosed which includes an RF converter and quadrature digitizer implemented in hardware and a signal processor including a computer, code generator and preprocessor. The preprocessor has a divide by 1,2,3 divider for controlling the code generator so as to provide I,Q early, prompt and late digital signals of 0.5 chip separations to the computer for tracking code phase, carrier phase/frequency and signal amplitude. This structure eliminates the need for numerically controlled oscillators implemented in hardware while maintaining accurate performance.

11 Claims, 15 Drawing Sheets

CODE MASTER ACCUMULATOR PHASE VALUE
HELD IN TWO PART WORD

WHERE: $\Delta o_i$ (UNITS OF HALF CHIPS) $= \hat{\phi}_i K T_s$
AT EACH ITERATION i.e., THE AVERAGE CHANGE IN CODE PHASE OVER $T_s$ INTERVAL INPUTS: REQUIRED ITERATION RATE $f_s = 1/T_s$
CODE LOOP FILTER
ESTIMATE OF
CODE PHASE
RATE $\hat{\phi}$

GLOBAL POSITION SYSTEM RECEIVER

BACKGROUND OF THE INVENTION

This invention relates to global position system (GPS) receivers and more particularly to a GPS receiver having computerized estimation and tracking of code phase, carrier phase/frequency and signal amplitude for hardware simplification.

The GPS is a navigation system which comprises a plurality of space vehicles (satellites) moving in space and transmitting radio frequency signals to earth. The spacer vehicles' locations at any selected time are precisely known. Thus, by measuring the timing relationship between received signals from different space vehicles, differences in receive timing from four or more space vehicles to the receiver can be used to determine the location of the receiver.

Space vehicle identification is made possible by modulating its carrier frequency signals (L1 and L2) with a P (precision) code and/or a C/A (coarse acquisition) code that is unique to that vehicle.

In the past, GPS receivers have used separate receiver channels for processing the high (L1) frequency signals and the low (L2) frequency signals transmitted by each satellite, and either separate receiver channels for each satellite of the GPS or the sequential operation of one receiver to receive the high and low frequency signals of each space vehicle for satellite tracking.

Then, GPS multiplexed receivers were introduced which utilized a single receiver channel under baseband processor control: first, to multiplex the L1 and L2 signals through the single receiver channel; and secondly, to multiplex amongst several satellites for tracking multiple space vehicles without reacquiring each space vehicle. In these systems the receiver baseband design was digital; thus, many receiver functions were implemented in software; the baseband software functions were also implemented on either hardwire or firmware. Those persons skilled in the art desiring more information concerning these GPS receivers are referred, respectively, to U.S. Pat. No. 4,485,383, issued Nov. 27, 1984 to Robert A. Maher and to U.S. Pat. No. 4,468,793, issued Aug. 28, 1984 to Charles R. Johnson et al.

In addition, an experimental GPS receiver/digital processing system has been operated. The basic technical approach of this receiver consists of a broadband, fix-tuned RF converter followed by a digitizer, digital-matched-filter acquisition section; phase- and delay-lock tracking via baseband digital correlation; software acquisition logic and loop filter implementation; and all-digital implementation of the feedback numerically controlled oscillators (NCOs) and code generator. Baseband in-phase (I) and quadrature phase (Q) tracking is performed by an arctangent angle detector followed by a phase-unwrapping algorithm that eliminates false locks induced by sampling and data bit transitions, and yields a wide pull-in frequency range approaching one-fourth of the loop iteration frequency. Those persons skilled in the art desiring more information concerning this receiver are referred to Ould and Van-Wechel, "All-Digital GPS Receiver Mechanization", Navigation: Journal of The Institute of Navigation, Vol. 28, No. 3, at 178, Fall 1981.

In all the above mentioned prior art devices, the clock signal for driving the PN code generator is provided by a code numerically controlled oscillator (NCO) implemented in hardware and the doppler corrected frequencies for phase tracking or frequency tracking the GPS carrier signal is provided by a carrier NCO implemented in hardware. The use of hardware NCOs unduly complicates the recevier's hardware, and increases the receiver's size, cost and efficiency.

In all of the prior art, a maximum of two samples (early and late) are used to form the estimate of code phase.

SUMMARY OF THE INVENTION

Accordingly, it is an object of this invention to provide a hardware simplified GPS receiver utilizing the estimation and tracking of code phase, carrier phase/frequency and signal amplitude in software.

Another object of the invention is to provide a low cost GPS receiver which is compact and efficient in operation.

A further object of the invention is to eliminate the requirements for a hardware carrier NCO and for a hardware code NCO.

Yet a further object of this invention is to improve the accuracy of estimation of code phase through use of simultaneous measurements at three or more distinct values of code phase rather than the two used by prior implementations.

Briefly stated, the GPS receiver of this invention utilizes a code clock divide by 1, 2, 3 circuit to replace the code NCO and computer instruction means for tracking substantially the carrier doppler.

BRIEF DESCRIPTION OF THE DRAWINGS

FIG. 4 depicts the timing relationship of the output of the code generator directly and after each 0.5 chip delay;

FIGS. 11a-11d depict the reaction of the divide by 1,2, 3 divider of FIG. 4a to the increment/decrement commands of FIG. 9a.

DESCRIPTION OF THE PREFERRED EMBODIMENT

RF Converter

Figure 1A:
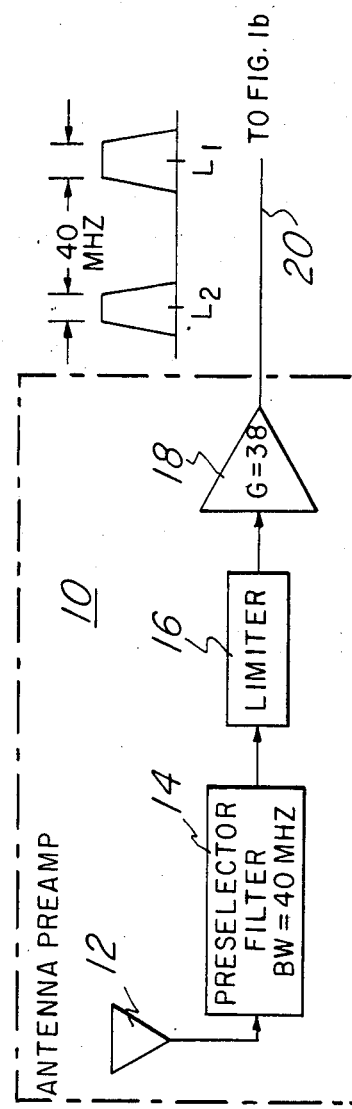
FIGS. 1a-1c constitute a schematic diagram of a GPS receiver's antenna preamplifier, mixer, IF amplifier stages and frequency synthesizer.

Referring now to the drawings, the global position system (GPS) receiver comprises an antenna/preamplifier 10 (FIG. 1a) having an antenna 12 for receiving RF (L1 and L2) signals from orbiting space vehicles (SVs). Each orbiting SV has unique P & C/A codes and two transmitters. One transmitter sends the codes at a preselected high (L1) frequency and the other transmitter sends the code at a preselected low frequency (L2). The high, L1 and low, L2, frequencies are the same for each of the space vehicles. A bandpass filter 14 is connected to the antenna for removing signals having frequencies outside the frequency range of the SV's (RF), radio frequency signals. A limiter 16 may be connected to the filter 14 for limiting stray interferers of strong amplitude. A preamplifier 18 is connected either to the limiter 16, if used, or to the filter 14 to amplify the RF signal to a working level. The limiter 16 protects the preamplifier from any damage due to strong interferers. The output of the amplifier 18 is at two center frequencies (L1 and L2) of about 1228 MHz and 1575 MHz each having 40 MHz bandwidths.

Figure 3:
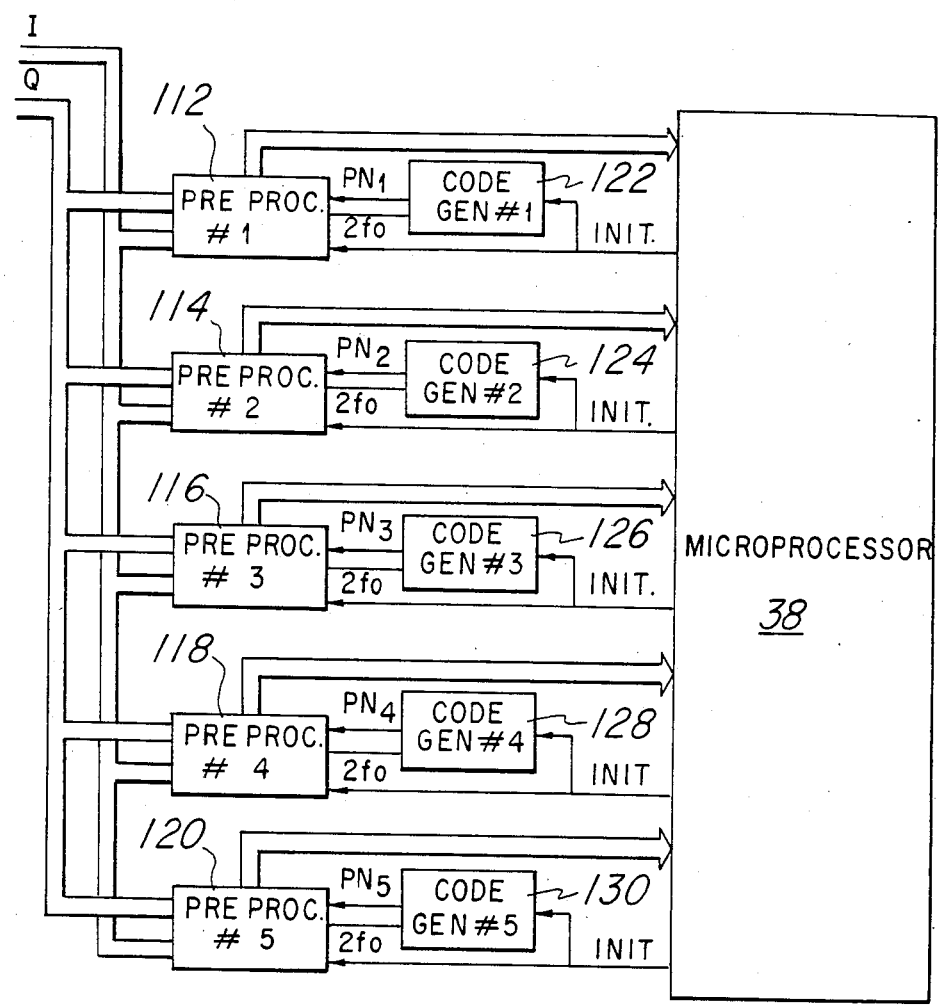

The preamplifier 18 has its output connected by lead 20 to a powder divider 22 (FIG. 1b) of a two stage down conversion RF module 24. Power divider 22 has an output connected to the high frequency L1 bandpass filter 26 and an output connected to low frequency bandpass filter 28. High frequency, L1, bandpass filter 26 and low frequency, L2, bandpass filter 28 limit the frequencies received to those of the space vehicles being tracked. The outputs of the high frequency, L1, and low frequency, L2, bandpass filters 26 and 28 (154 MHz fo (L1) and 120 MHz fo (L2) are connected to a switch 30 which is controlled by a flip flop 32. Flip flop 32 has its clock terminal connected by lead 34 to an RF multiplexer clock (not shown) and its data in terminal connected by lead 36 to the L1,L2 frequency control signal of the baseband control 38 (FIG. 3). The L1, L2 processor signal sets the flipflop 32 (FIG. 1b) which then switches precisely with the clock signal. The flip flop 32 controls the switch 30 to admit alternately the L1 and L2 coded frequency signals to a first stage mixer 40 of the first stage 42 of the two stage down conversion RF module 24. For example, the L1 frequency may be admitted for a 10 millisecond period and then the L2 frequency is admitted for 10 milliseconds or vice versa. As the local oscillators are part of the frequency and clocking system, it will now be described.

Figure 1B:
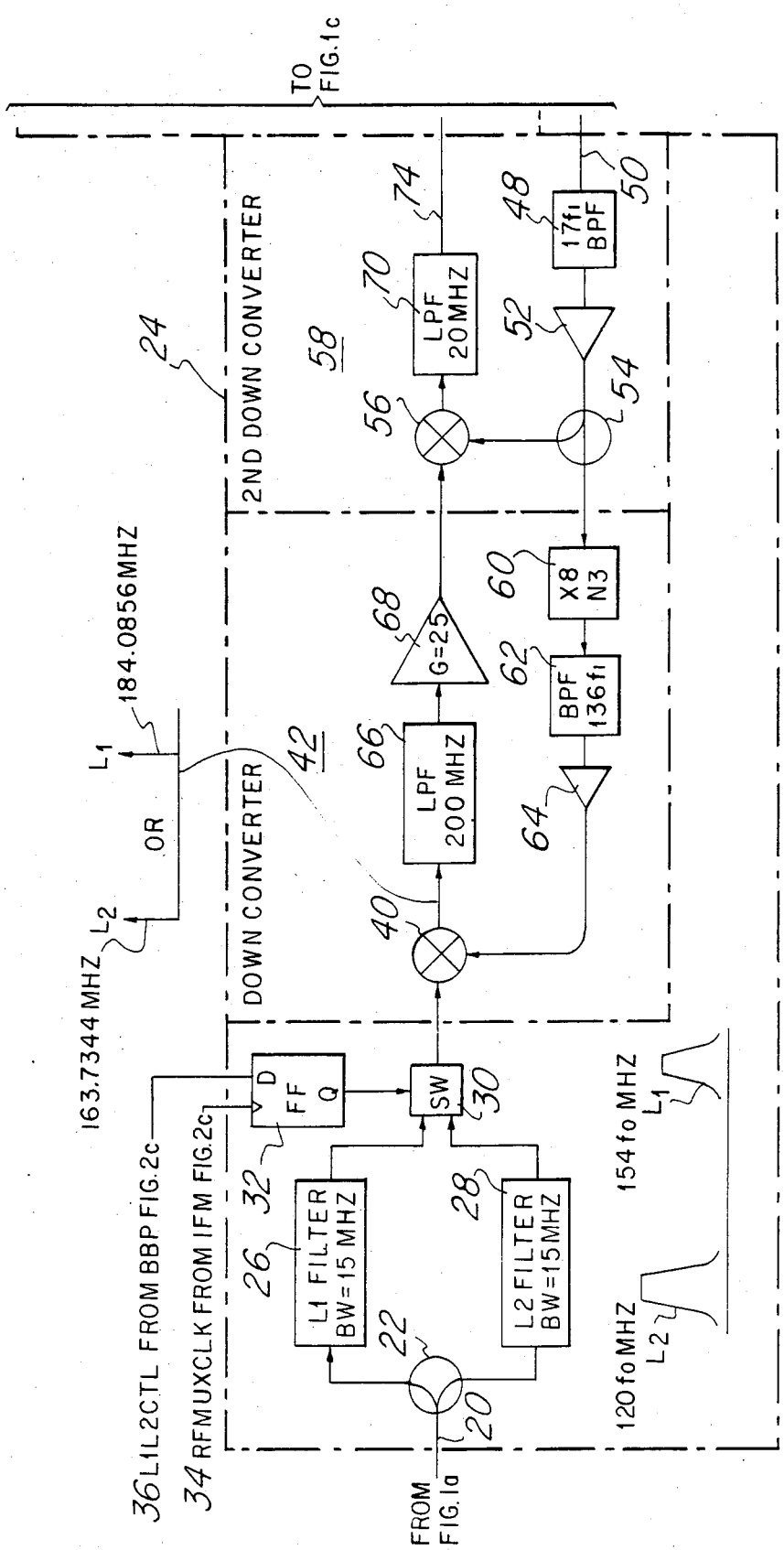
Figure 1C:
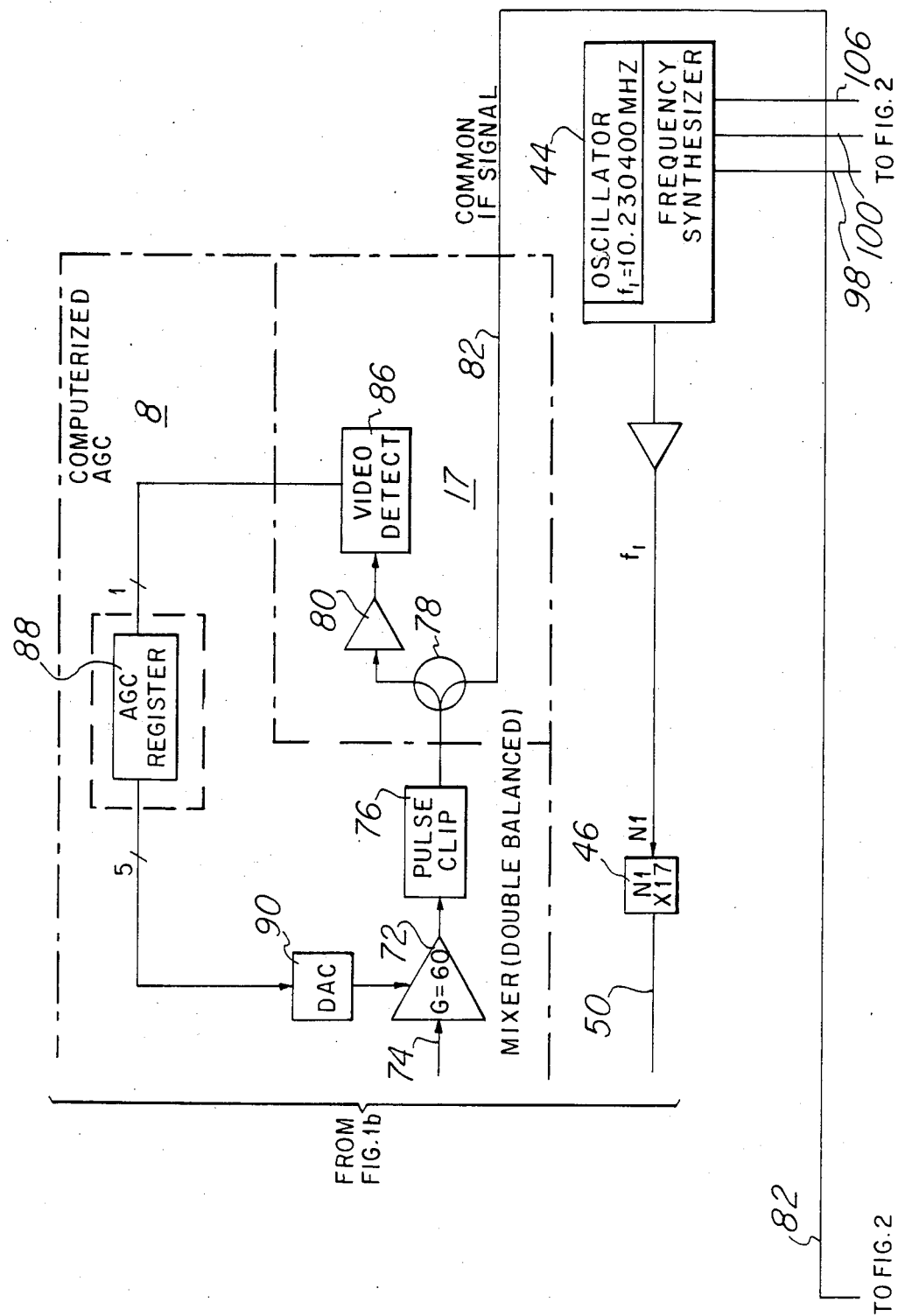

A frequency synthesizer 44 (FIG. 1c) provides an f1 frequency (10.2304 MHz) signal to a multiply by 17 multiplier 46. A bandpass filter 48 (FIG. 1b) is connected by lead 50 to the 17× multiplier 46 (FIG. 1c). An amplifier 52 is connected to the bandpass filter 48 for signal amplitude restoration. A power divider 54, connected to the amplifier 52, divides the power between a mixer 56 of a second stage down converter 58 and a multiply by 8 multiplier 60. A bandpass filter 62 is connected to the multiply by 8 multiplier 60 for removal of unwanted frequencies, and an amplifier 64 is connected to the bandpass filter 62 for signal restoration. The output of the amplifier 64 is a 136f1 first local oscillator (LO) signal connected to the first stage mixer 40. The output of the first stage mixer 40 is either a 163.7344 MHz L2 signal or a 184.0856 MHz L1 signal. A lowpass filter 66 is connected to mixer 40 and an amplifier 68 is connected to the lowpass filter 66 for signal restoration. The amplifier 68 completes the elements of the first stage down converter 42.

The mixer 56 of the second stage down converter 58 beats the first stage downconverted signal with a second LO signal from power divider 54 and outputs an IF signal to a lowpass filter 70. An AGC amplifier 72 (FIG. 1c) is connected by lead 74 to the lowpass filter 70 (FIG. 1b). AGC amplifier 72 (FIG. 1c) provides automatic gain control (AGC).

Figure 2:
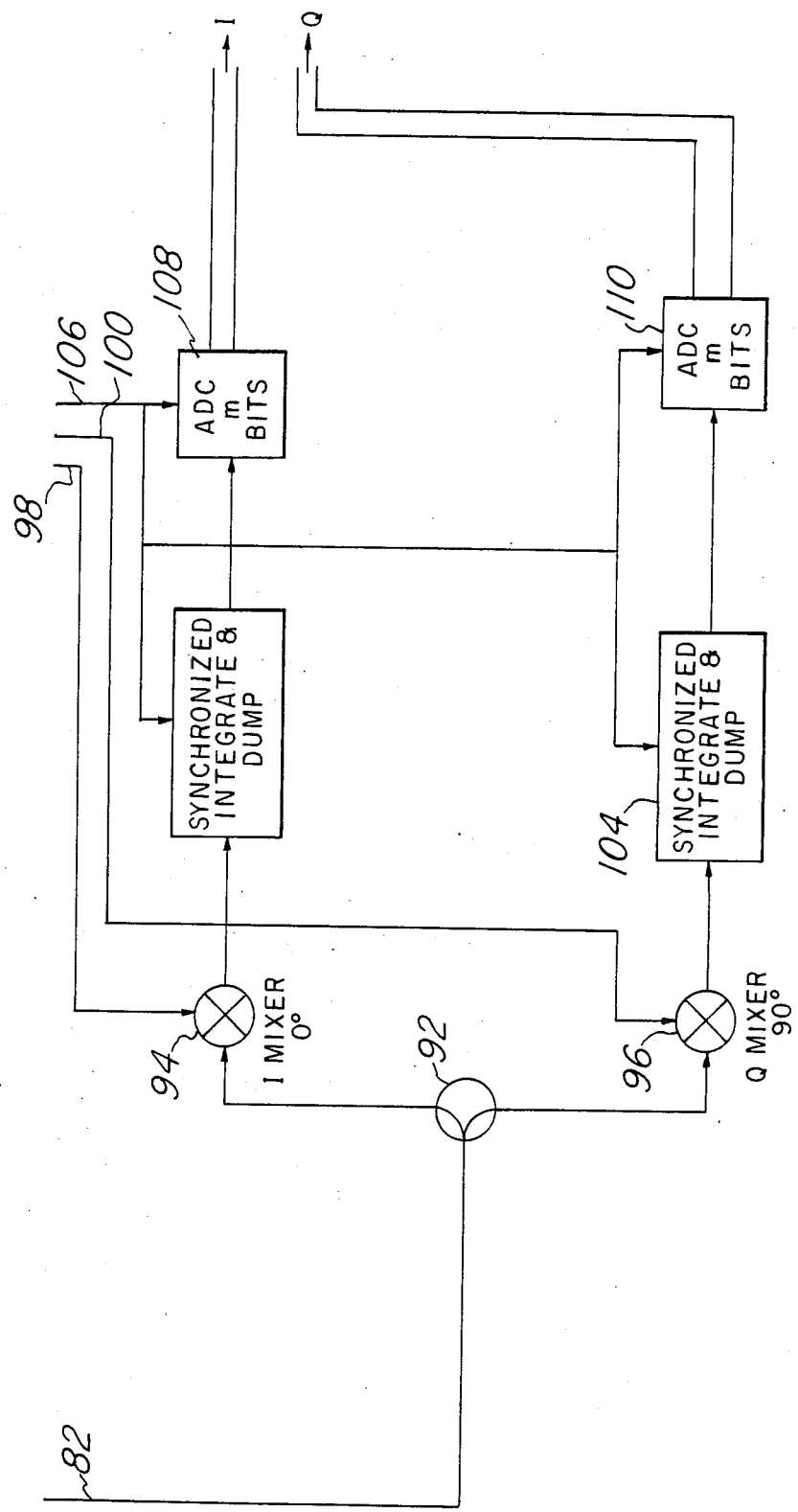
FIG. 2 is a schematic diagram of the receiver's in phase (I) and quadrature (Q) circuits and ADC circuits for producing digitized signals of the carrier modulated GPS signals.

A pulse clip circuit 76 is connected to the AGC amplifier 72 for clipping the amplitude of any interference signals such as those generated by any local radar operation. The output of the pulse clip circuit 76 is connected to a power divider 78. The power divider 78 has one output connected to an amplifier 80 of the wideband automatic gain control circuit, and a second output connected by lead 82 to a power divider 92 of a quadrature digitizer circuit (FIG. 2). The amplifier 80 (FIG. 1c) is connected to a video detector 86. Video detector 86 detects the signal amplitude envelope. Whether this value is above or below a threshold, this information is sent in one bit outputs to the processor 38 (FIG. 3). While the AGC register 88 is a part of the processor 38 for ease of description it is broken out of the processor 38 and included in the circuit of FIG. 1c. The processor 38 uses this to adjust the value of an AGC register 88. The AGC register 88 represents the AGC voltage which, when needed, is applied to a digital to analog converter (DAC) 90. The output of the DAC 90 is connected to the AGC amplifier 72 for maintaining a constant voltage output.

Quadrature Phase Digitizer

The power divider 92 (FIG. 2) is connected to power divider 78 for dividing the RF energy between two outputs for an in-phase (I) channel and a quadrature phase (Q) channel. The I and Q channels include, respectively, mixers 94 and 96 having first inputs connected to the power divider 92 output terminals and second inputs connected by leads 98 and 100 to the frequency synthesizer 44 (FIG. 1c) for receiving in phase, I, and quadrature phase, Q, third LO signals. Synchronized integrate and dump circuits 102 and 104 (FIG. 2) are connected, respectively, to the I and Q mixers 94 and 96 and by lead 106 to the frequency synthesizer 38 (FIG. 1c) for receiving synchronization signals at a 2fo clocking rate, where $f_o$ is the nominal code chipping rate. Analog to digital converters (ADCs) 108 and 110 (FIG. 2) are connected, respectively, to the synchronized integrate and dump circuits 102 and 104 and by lead 106 to the frequency synchronization 38 (FIG. 1c) to receive the 2fo output thereof. The ADCs digitize the RF analog signals into I and Q words of "m" bits. preferably the words are between 1 to 8 bits in length. This completes the quadrature digitizer.

Signal Processor

A signal processor (FIG. 3) includes a plurality of digital preprocessors 112, 114, 116, 118 and 120 operatively connected to the quadrature digitizer, a corresponding plurality of code generators 122, 124, 126, 128 and 130 operatively connected to the preprocessors, and the processor 38 which may be, for example, a microprocessor. The code generators provide the space vehicles, precision or coarse acquisition codes to the preprocessors. Each preprocessor computes In phase early, $I_E$, and quadrature phase early, $Q_E$, In phase prompt, $I_P$, and quadrature phase prompt, $Q_P$, and In phase late, $I_L$, and quadrature phase late, $Q_L$, complex responses for one SV code. The computer means performs functions as follows: code loop tracking, carrier loop tracking, signal-to-noise estimation, initialization and code search.

Preprocessing Circuit

As the digital preprocessors 112, 114, 116, 118 and 120 are identical in construction only one need be described. An example of the preprocessor which is preferably a monolithic circuit includes a divide by (n−1), n, (n+1) circuit, with n being an integer of 2 or more. In our example, a divide by 1,2,3 divider 132 is connected to the frequency synthesizer 44 (FIG. 1c) for receiving the 2fo frequency and providing selected code clock signals to its code generator 122. Both the divide by 1,2,3 and the code generator are connected to the microprocessor 38 (FIG. 3) for receiving a common initialization signal.

Figure 4:
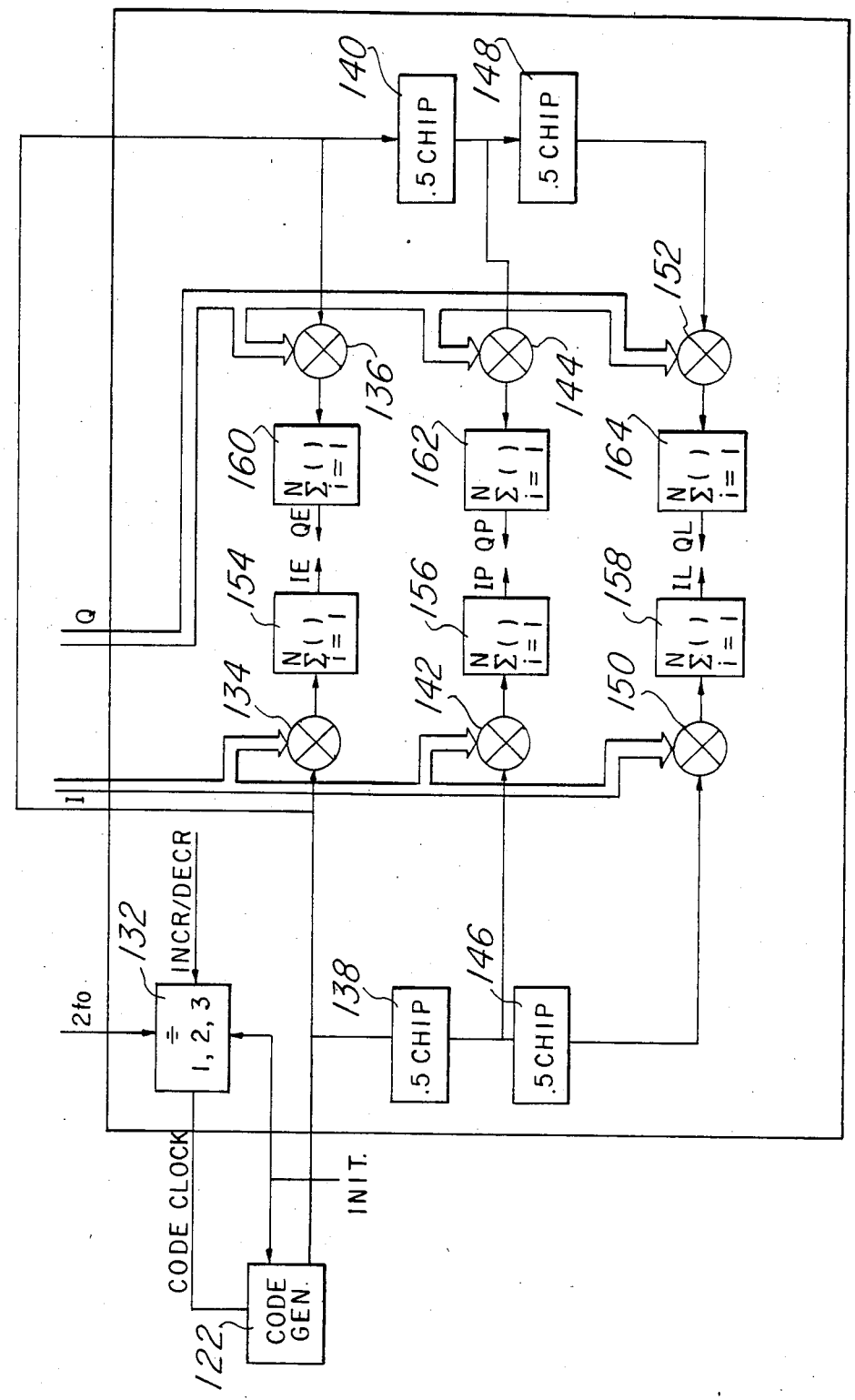
FIG. 4 is a block diagram of the receiver's digital signal preprocessor.

The code generator 122 is connected to I and Q channels, respectively, as follows: the junctions of 0.5 chip early signal multipliers 134 and 136 and first 0.5 chip delay circuits 138 and 140. The first 0.5 chip delay circuits 138 and 140 are connected to the junctions of prompt signal multipliers 142 and 144 and second 0.5 chip delay circuits 146 and 148. The second 0.5 chip delay circuits 146 and 148 are connected to a 0.5 chip late signal multipliers 150 and 152. The skewed effect of the timing delay on the output of the code generator is shown in FIG. 4b.

The I channel multipliers 134, 142 and 150 and the Q channel multipliers 136, 144 and 152 are also connected, respectively to the I and Q ADCs 108 and 110 (FIG. 2). The outputs of the I channel multipliers 134, 142 and 150 and the outputs of the Q channel multipliers 136, 144 and 152 are connected, respectively, to I channel accumulators 154, 156 and 158 and to Q channel accumulators 160, 162 and 164. The I channel accumulators 154, 156 and 158 and the Q channel adders 160, 162 and 164 are connected to the microprocessor to input, respectively, the $I_E$, $I_P$ and $I_L$ and $Q_E$, $Q_P$ and $Q_L$ outputs to the microprocessor 38. The six accumulators sum a preselected number (n) of samples for the processor.

Microprocessor

Figure 5:
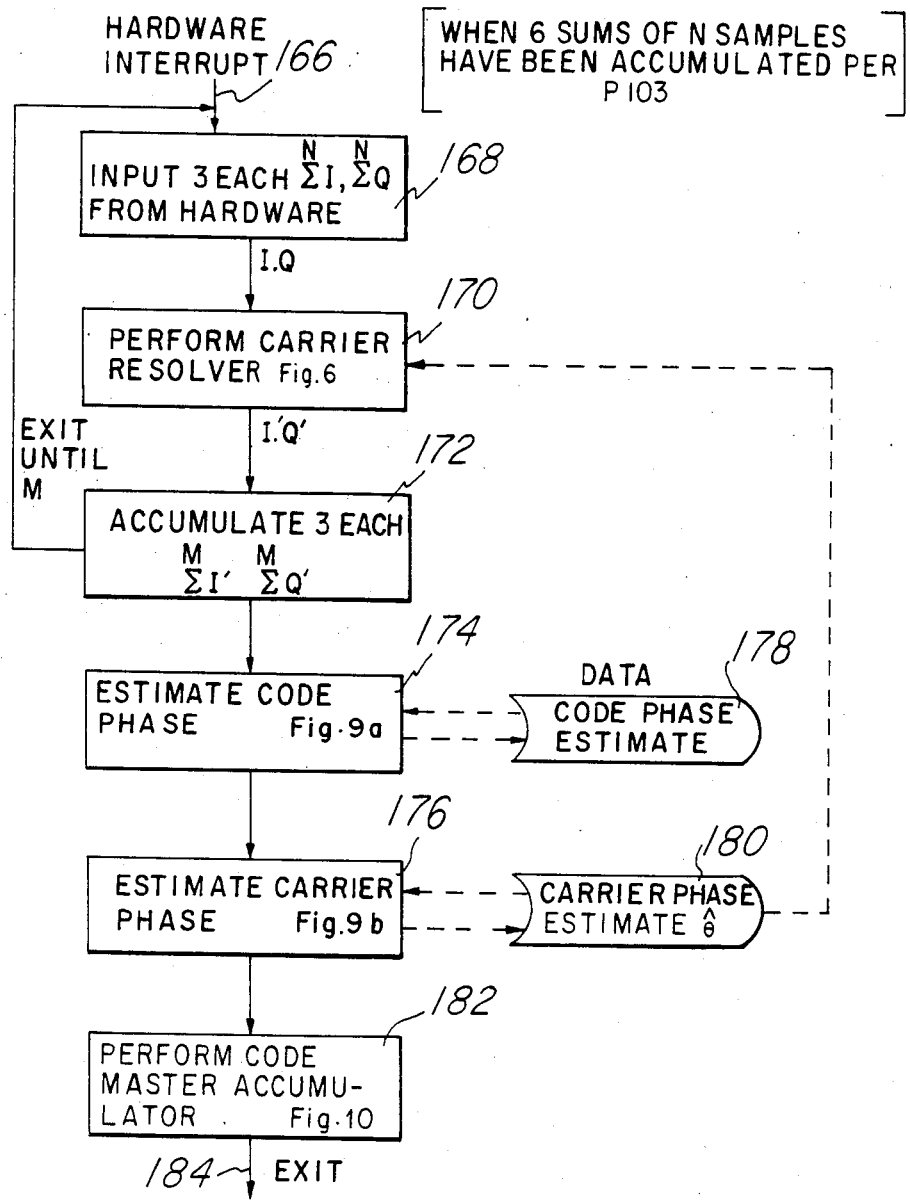
FIG. 5 is a flowchart describing the signal processing functions carried out in the microprocessor.

Referring now to FIG. 5 there is shown a flow diagram for the operation of the processor 38. The processor 38 at hardware interrupt (166) interrupts other microprocessor operation when six sums of N samples have been accumulated for inputting (168) the three I and three Q signals. After entry, rotation is performed (170) on the spinning I,Q signals (early, prompt and late) to produce despun in phase, I', and quadrature phase', Q', signals. These steps are repeated until accumulation is made of "M" despun early, prompt and late I',Q' signals (172). Upon accumulation of the I',Q' signals, the carrier and code phase estimates are made (174),(176) and stored (178), (180). After carrier and code phase estimations are made, code master accumulation (182) is performed and exit (184) made.

Tracking In Resolvers

Figure 6:
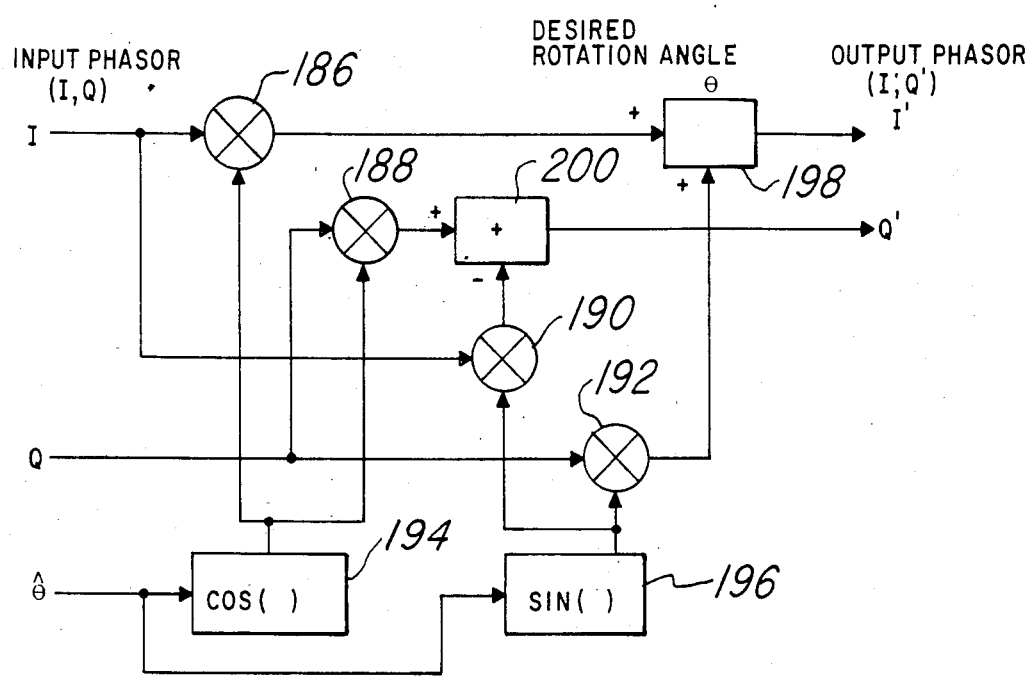
FIG. 6 is a schematic diagram of the resolvers used in carrier and code tracking.

Referring now to FIG. 6, the computer performed resolver functions are similar to the function of hardware resolvers used in digital processing. In digital processing, the spinning I and Q signals are connected to a plurality of multipliers 186, 188, 190 and 192. The I signals are connected to multipliers 186, and 190. The Q signals are connected to multipliers 188 and 192. While the $\theta$ signals, which are the carrier estimated phases, are connected to a cosine generator 194 and a sine generator 196. The cosine generator 194 is connected to the multipliers 186 and 188 and the sine generator 196 is connected to multipliers 190 and 192. Multipliers 186 and 192 are connected to adder 198 for summing the I times cosine $\theta$ and the Q times sine $\theta$ for forming the I' output phasor. While, multipliers 188 and 190 are connected to adder 200 for summing the Q times cosine $\theta$ and the Q times sine $\theta$ for forming the minus Q' output phasor.

The computer performed resolver resolution function includes instructions for multiplying the I signals by cosine $\theta$ and the Q signals by sine $\theta$ and summing the product for forming the I' output phasor. While, multiplying the Q signals by cosine $\theta$ and the I by sine $\theta$ and summing the product for forming the Q' output.

Code Phase and Carrier Phase Estimating

Figure 8:
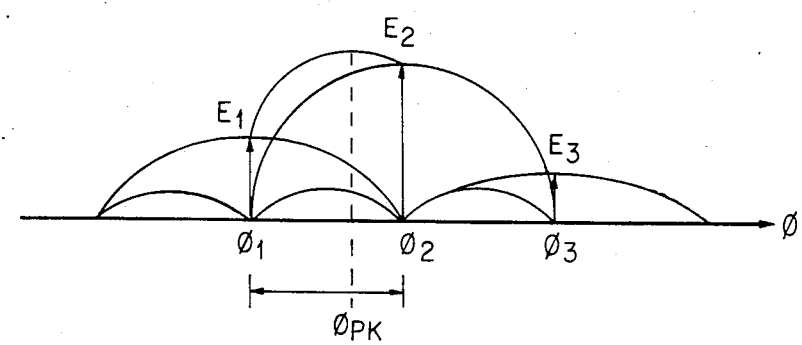
FIG. 8 is a graph of the correlation envelope responses obtained from the complex samples of FIGS. 7a and 7b.

The code and carrier phase error estimations (FIGS. 7a and 7b) are determined, using, for example, three complex samples (FIG. 7a) as follows:

$(I_1, Q_2)$ at $\phi_1$ $(I_2, Q_2)$ at $\phi_2 = \phi_1 + \pi$ $(I_3, Q_3)$ at $\phi_3 = \phi_1 + 2\pi$ From the three complex samples three envelopes, for example, are found (202) (FIG. 7a); these envelopes are:

$E_1 = (I_1^2 + Q_1^2)^{\frac{1}{2}}$ $E_2 = (I_2^2 + Q_2^2)^{\frac{1}{2}}$ $E_3 = (I_3^2 + Q_3^2)^{\frac{1}{2}}$ Using the three envelopes, the continuous envelope response is defined (204) as follows:

$E(\phi) = E_1 \text{Sin}(\phi - \phi_1)/(\phi - \phi_1) + E_2 \text{Sin}(\phi - \phi_1 - \pi)/(\phi - \phi_1 - \pi) + E_3 \text{Sin}(\phi - \phi_1 - 2\pi)/(\phi - \phi_1 - 2\pi)$ From the continuous envelope response, the largest of $E_1$, $E_2$ and $E_3$ is chosen (206). As shown, for example, in FIG. 8, $E_2$ is the largest. Next, the larger ($E_1$) in FIG. 8 of the remaining nearest neighbors $E_1$, $E_3$ is chosen 208. These two chosen signals ($E_2$ and $E_1$) define end points for a peak search using interval halving (210) to find the maximum amplitude [max $E(\phi)$] at location $\phi_{peak}$. At $\phi_{pk}$, $\phi_1$ is less than or equal to $\phi$ which is less than or equal to $\phi_2$. The $\phi$ at $\phi_{pk}$ is the best estimate of the code phase, and the relative code phase ($\phi$Rel) is determined (212) by subtracting the peak phase from the $\phi_2$.

The carrier phase estimate (FIG. 7b) is determined by evaluating (214) $I(\phi = \phi_{pk})$, $Q(\phi = \phi_{pk})$ as follows:

$I = I_1 \text{Sin}(\phi_{pk} - \phi_1)/(\phi_{pk} - \phi_1) + I_2 \text{Sin}(\phi_{pk} - \phi_2)/(\phi_{pk} - \phi_2) + I_3 \text{Sin}(\phi_{pk} - \phi_3)/(\phi_{pk} - \phi_3)$ $Q = Q_1 \text{Sin}(\phi_{pk} - \phi_1)/(\phi_{pk} - \phi_1) + Q_2 \text{Sin}(\phi_{pk} - \phi_2)/(\phi_{pk} - \phi_2) + Q_3 \text{Sin}(\phi_{pk} - \phi_3)/(\phi_{pk} - \phi_3)$ After evaluating the in phase, I, and quadrature phase, Q, signals for the peak phase, the carrier phase ($\hat{\theta}$) is estimated (216) using the FORTRAN function A TAN 2 $[2[Q(\phi_{pk}), I(\phi_{pk})]$.

Estimate Of Code Phase

Figure 9A:
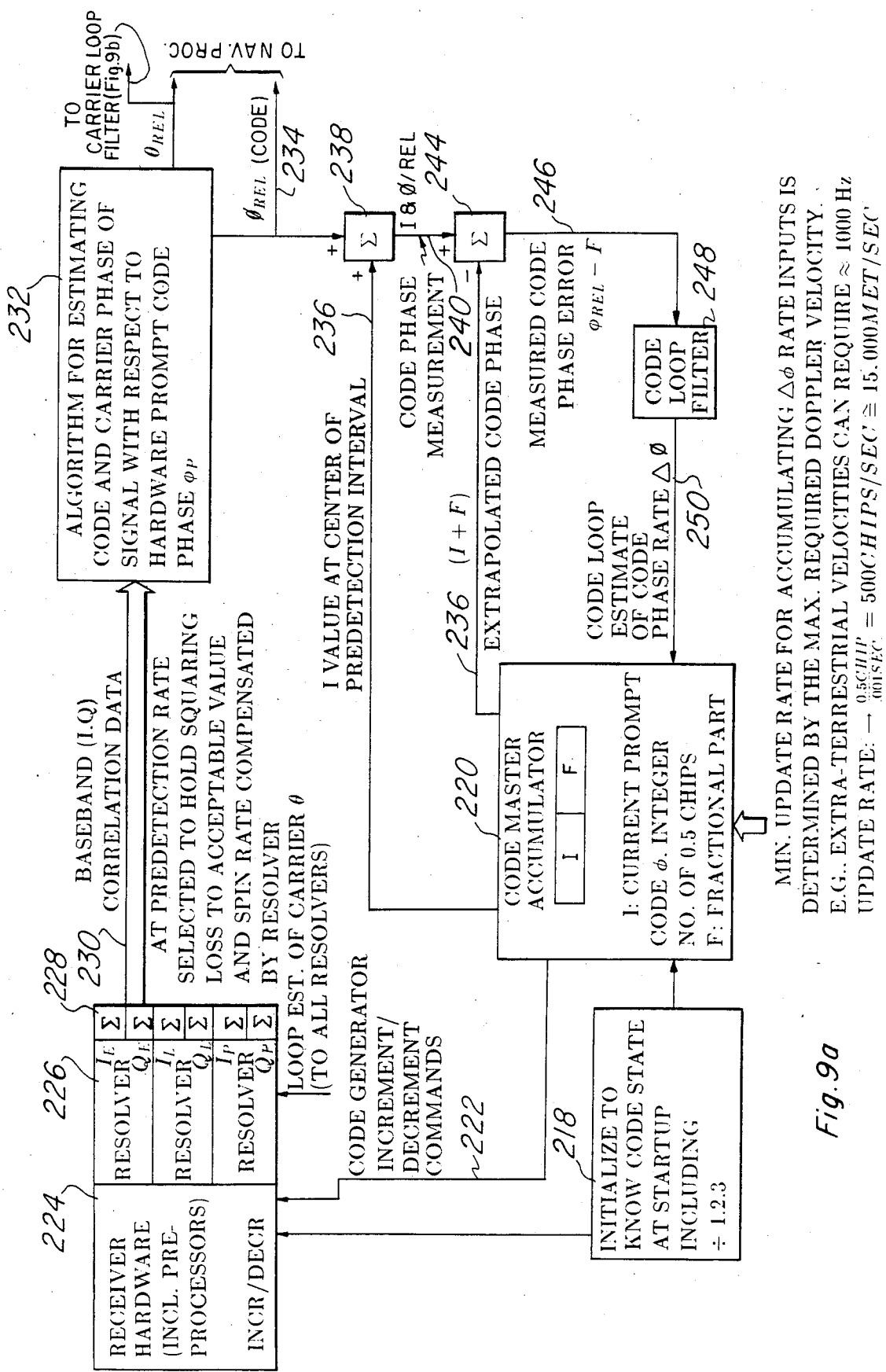
FIGS. 9a and 9b constitute a flow chart of the code and carrier tracking algorithm.

Referring now to FIG. 9a in which is shown by a flow chart how the error measurements of code phase are combined with stored information of the timing state of the hardware to develop an instantaneous code phase measurement $(I+\phi Rel)$ before subsequent smoothing by a code loop filter.

Figure 10:
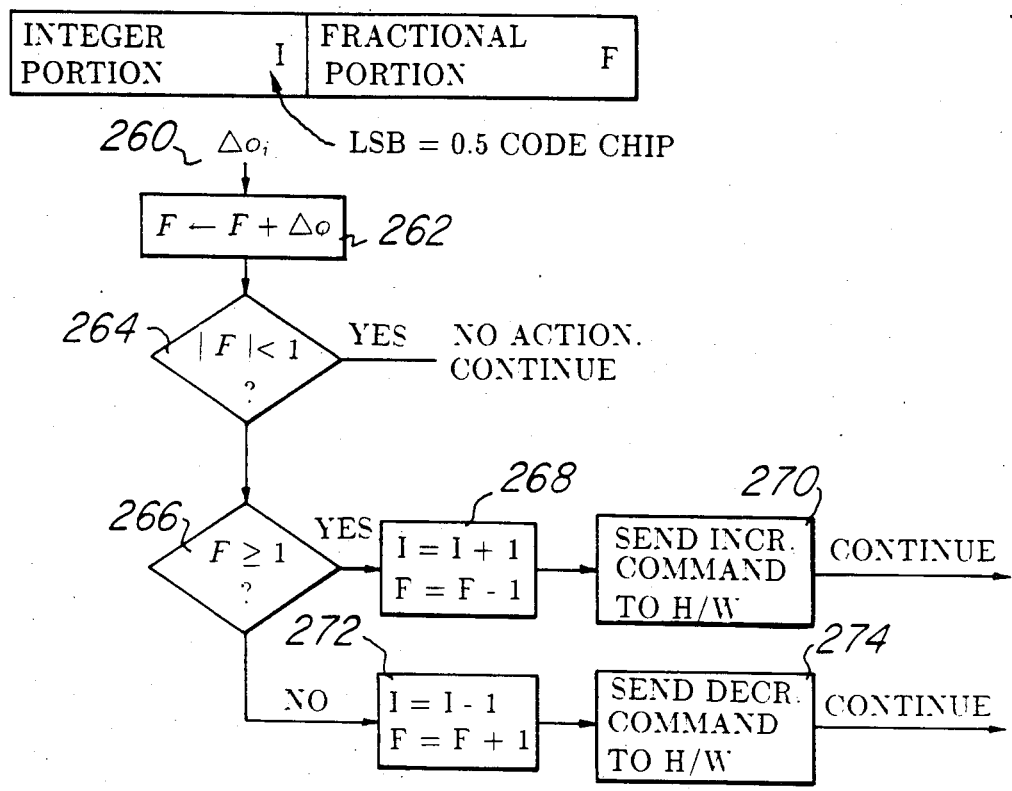
FIG. 10 is a flow chart of the code master accumulator.

At start up 218 the microprocessor initializes the code generator 122, the divide by 1,2,3 circuit 132 of the preprocessor (FIG. 4a) and a code master accumulator 220 (FIG. 10). The code master accumulator 220 after initialization outputs increment/decrement commands 222 to the preprocessor's divide by 1,2,3 divider. For clarity the receiver hardware including the preprocessors is included in block 224 of FIG. 9a.

Figure 7A:
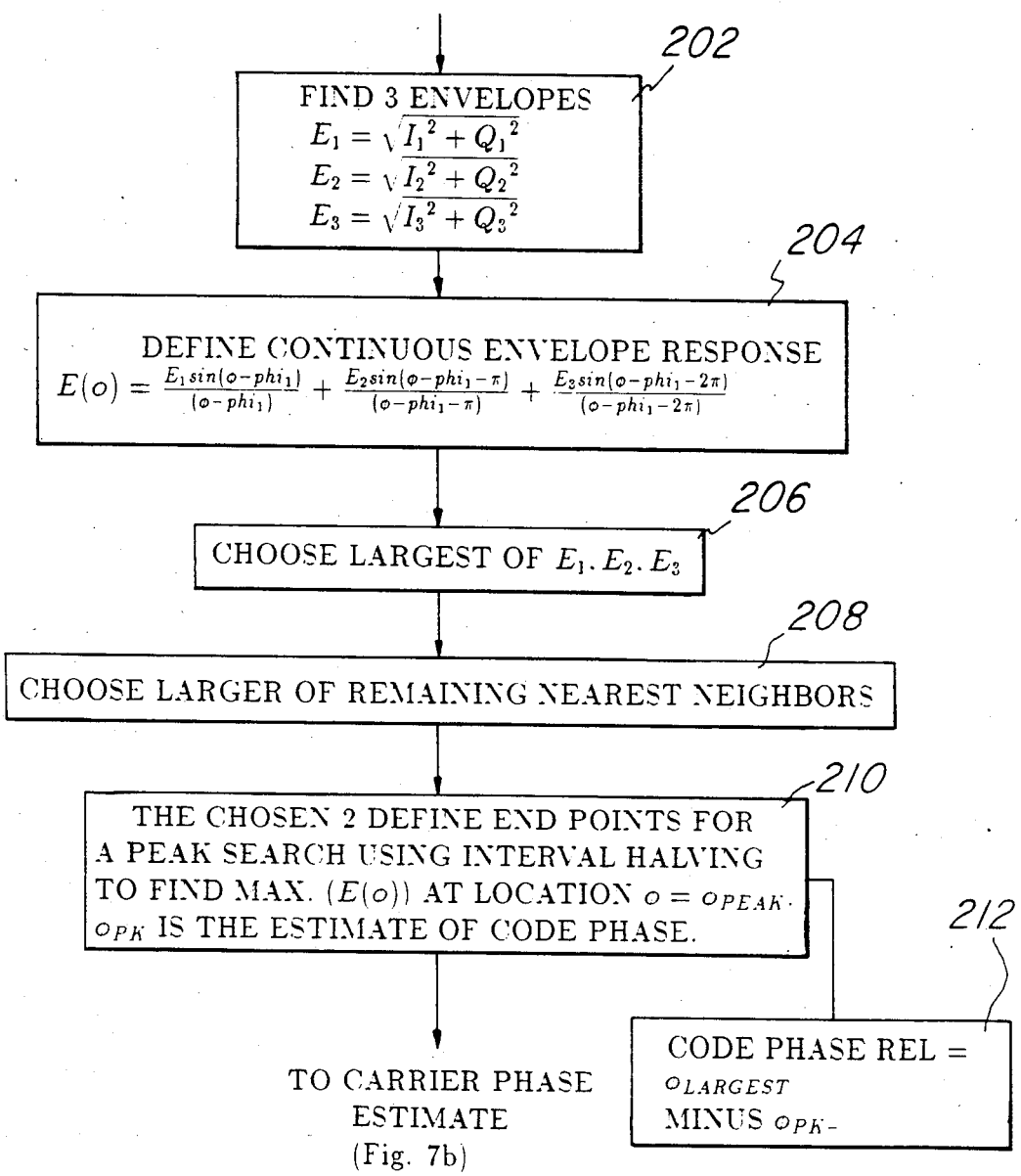
FIGS. 7a and 7b are a combined flow chart for estimating code phase and carrier phase from 3 complex samples of correlation response.
Figure 7B:
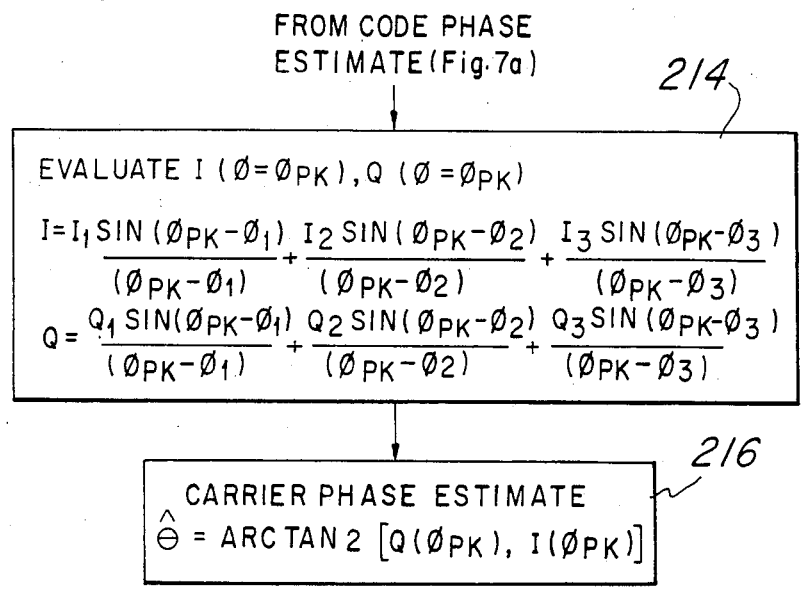
Figure 9B:
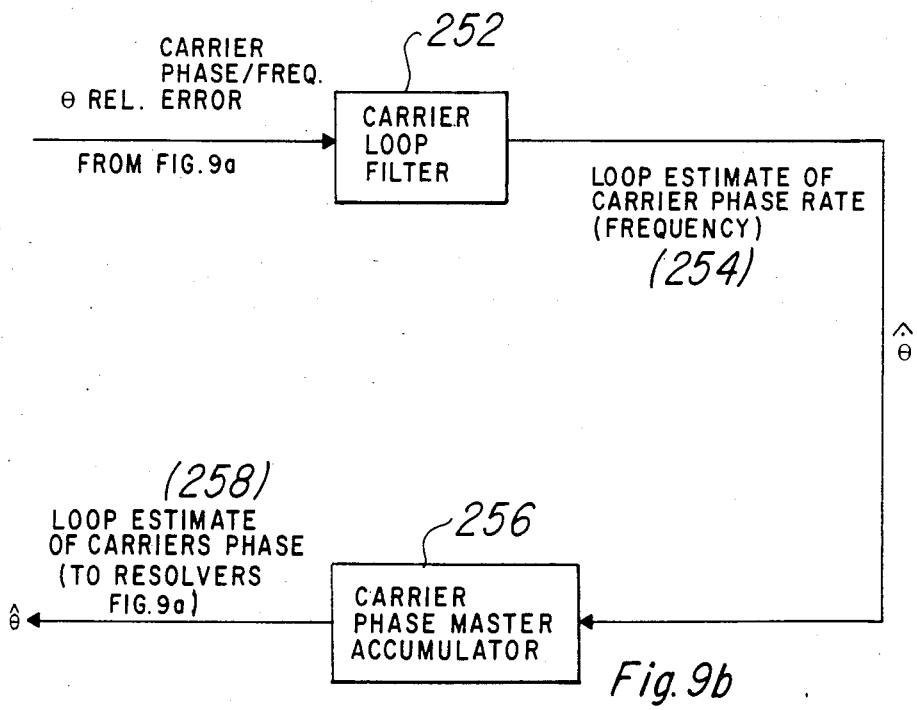

The receiver hardware 224 provides baseband in phase, I, and quadrature phase, Q, signals which together with the loop estimate of carrier phase (FIG. 9b) is combined in the resolvers (226) for despinning and summed in adders (228) for forming baseband correlation data (230) at a predetection rate selected to hold squaring loss to an acceptable value for the code and carrier phase estimating algorithm 232 (FIG. 7a). The algorithm provides estimations of the code and carrier phase of the incoming signal with respect to the hardware prompt code phase. The output 234 is the carrier relative phase and the code relative phase. The carrier relative phase is the input to the carrier phase estimating loop (FIG. 9b). The code relative phase (FIG. 9a) is added to the I value representative of the timing of center of the predetection interval 236 in adder 238.

The code phase measurement output 240 of the adder 238 $(I+\phi_{REL})$ is added to the negative of an extrapolated code phase 242 $(I+F)$ of the code master accumulator 220 in a second adder 244. The output 246 of the adder 244 is the measured code phase error $(\phi_{REL}-F)$, where F is a fractional part of a chip; the code phase error is input to a code loop filter 248. The output of the code loop filter 248 is the code loop estimate of the code phase rate 250 which is inputted into the code master accumulator 220. The minimum update rate for accumulating the difference phase rate inputs in the code master accumulator is determined by the maximum required doppler velocity; e.g., extra-terrestrial velocities can require an update rate of approximately 1000 Hz. An update rate of about 1000 Hz would be appropriate for a velocity of about 15,000 meters per second.

Estimating Carrier Phase

Referring now to FIG. 9b there is disclosed a flow chart for the loop estimating carrier phase. The carrier relative phase output (235) (FIG. 9a) represents the carrier phase/frequency error. The phase/frequency error is input to a carrier loop filter 252 (FIG. 9b). The output of the carrier loop filter 252 is the loop estimate of carrier phase rate (frequency ($\dot{\hat{\theta}}$)) (254). FIG. 9b). A carrier phase master accumulator 256 is connected to the carrier loop filter for producing the loop estimate of carrier phase for input into the resolvers (226) (FIG. 9a).

Code Master Accumulator

Referring now to FIG. 10 there is shown a flow chart for the code maser accumulator 220 (FIG. 9a). The code master accumulator (FIG. 10) accumulates the code loop estimates of the code phase rate $(\Delta\dot{\phi})$ (250) from the code loop filter output 248 for developing a code loop estimate of the signal code phase. The inputs are the required iteration rate $(f_s=1/T_s)$ and the code loop filter estimate of the code phase rate. At each iteration, $(\Delta\phi_i)$ in units of half chips is equal to the average change in code phase ($\dot{\phi}$) over the $T_s$ interval.

The code master accumulator phase value is held in a 2 part word: an integer part (I) and a fractional part (F). The least significant bit of the integer portion is equal to 0.5 code chip. Thus, $\Delta\phi_i$ (260) is the input and the processor 38 updates F (262) to $F+\Delta\phi$ and a decision (264) made as to whether $|F|$ is less than 1; if yes, no action is taken and the iterations continue until decision (264) is made that $|F|$ is greater than or equal to 1. Then decision (266) is made to determine the sign of F. If decision (266) is that F is positive, then the computer sets (268) $I=I+1$, and $F=F-1$ and sends (270) an increment command to the divide by 1,2,3 and the cycle continued. However, if the decision (268) is that F is negative, the computer sets (272) $I=I-1$, and $F=F+1$ and sends it (274) a decrement command to the divide by 1,2,3 and the cycle continued.

Figure 11A:
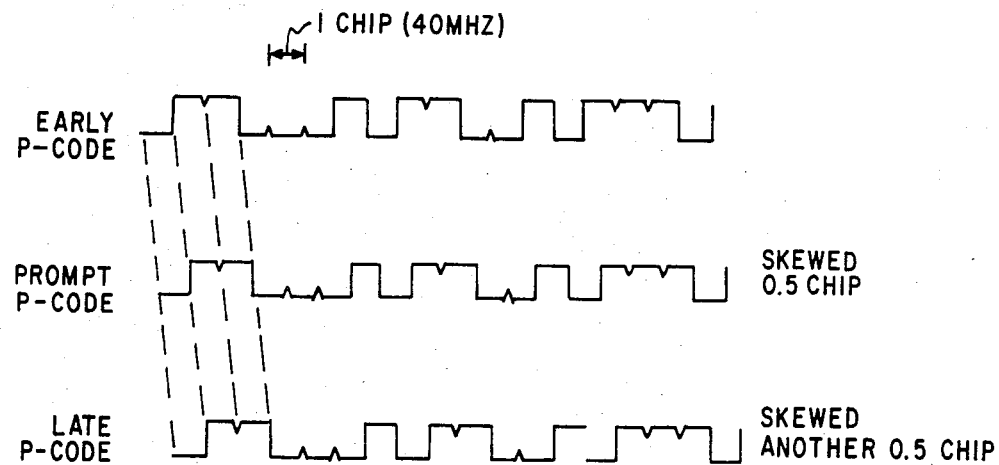
Figure 11A:
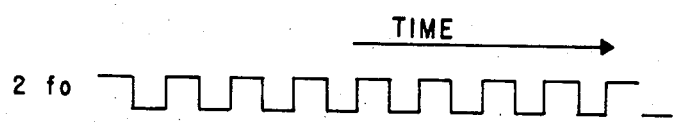
Figure 11B:
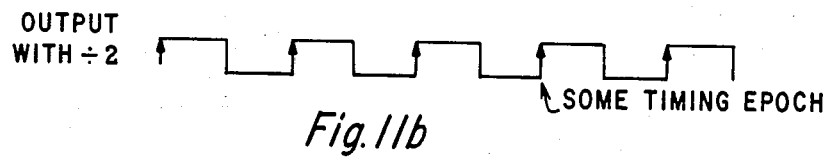
Figure 11C:
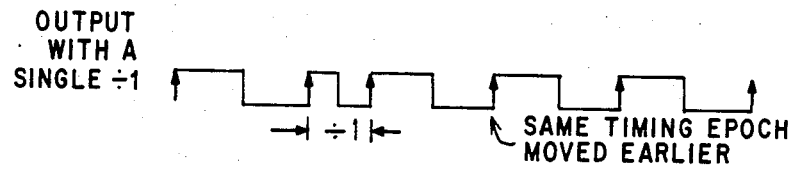
Figure 11D:
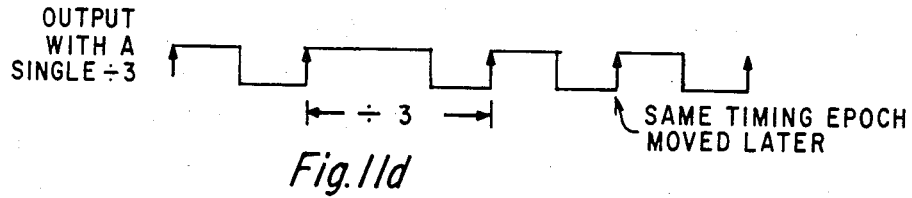

Divide by 1,2,3,

Referring now to FIGS. 11a–11d, the frequency synthesizer 44 (FIG. 1c) is providing a 2 fo (FIG. 11a) to the divide by 1,2,3 divider 132 (FIG. 4a). Each cycle in FIG. 11a is equal in time to one-half chip of the code. With the increment/decrement signal 222 the divide by 1,2,3 is in the divide by 2 mode to provide the code generator clock. When a decrement signal is received at some timing epoch, the divide by 1,2,3 enters the divide by 1 mode (FIG. 11c) to move the same timing epoch one-half chip earlier. And finally, when an increment signal is received, the divide by 1,2,3 enters the divide by 3 mode (FIG. 11d) to move the same timing epoch one-half chip later. Thus, the divide by 1,2,3 provides the means to advance or retard the code generator phase.

Option 1 For Signal Estimation

Figure 12A:
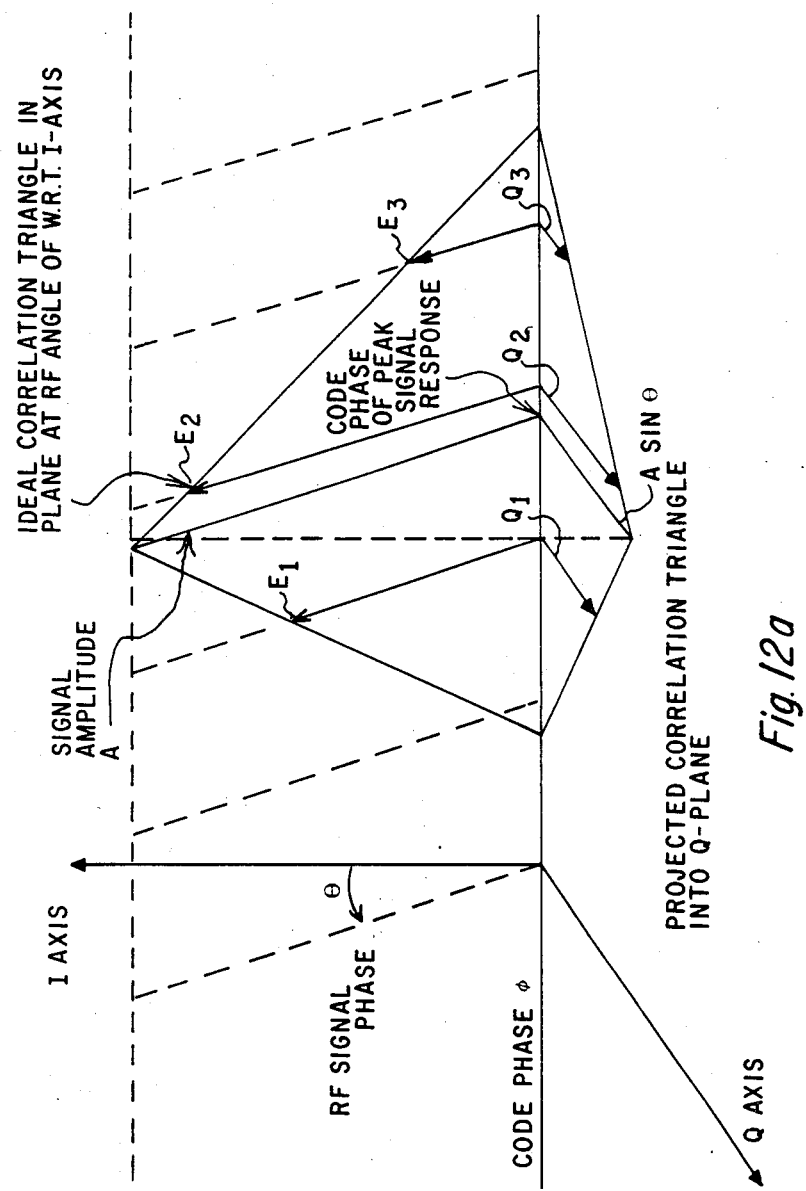
FIGS. 12a and 12b are charts, respectively, of projected correlation triangles in the Q-plane and I-plane.
Figure 12B:
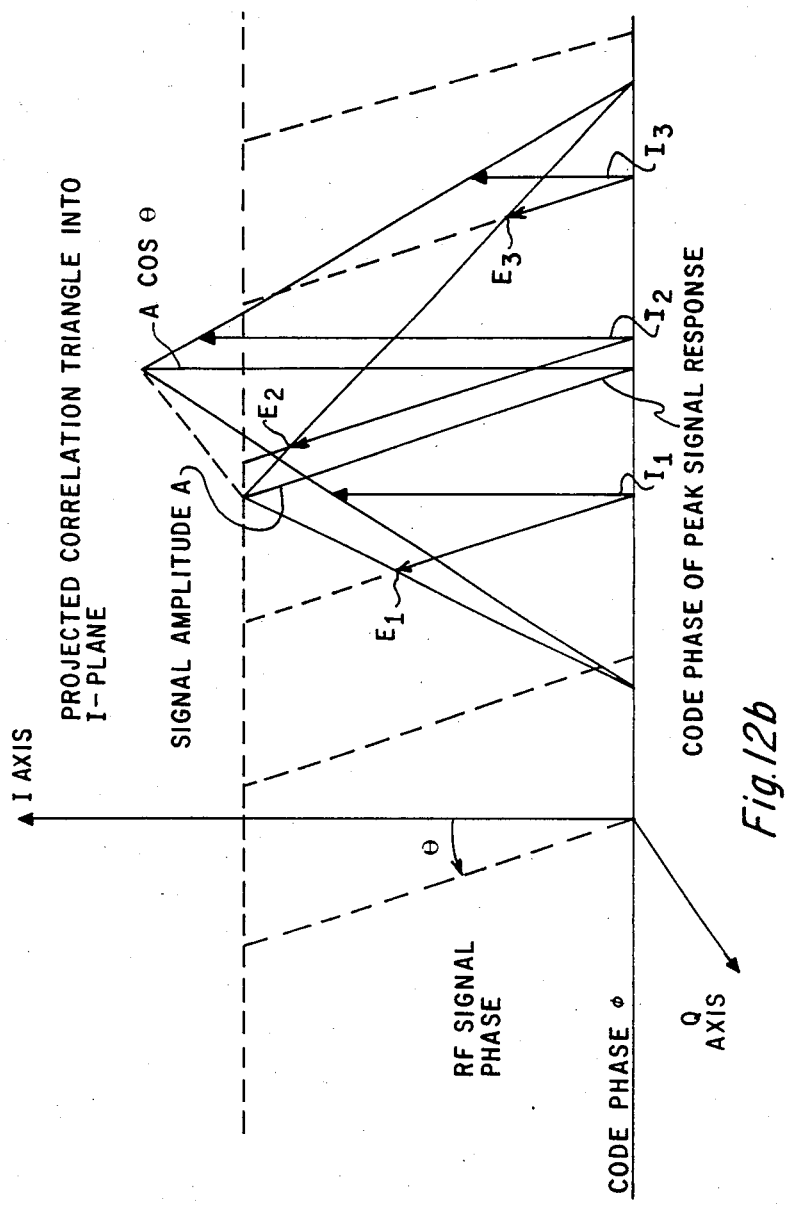

There are other ways for accurately estimating the phase where the correlation triangle is peaked. In another embodiment, a plurality (at least three) of projected correlation triangles, such as the Q quadrature phase; and I in phase projected correlation triangles shown in (FIGS. 12a and 12b), having varying amplitudes (but always two chips wide at the base) are iteratively scanned back and forth in code phase, around 360 degrees in carrier phase, and up and down in signal amplitude and the means squared error computed between three I/Q sample pairs for each case. The case with the least mean squared error is chosen. Its values of signal code phase, signal carrier phase and signal amplitude are the best estimate of these parameters. FIGS. 12a and 12b disclose a correlation triangle projected, respectively, into the Q-plane and the I-plane. FIG. 12a shows the ideal correlation triangle in a plane at RF phase angle of O with respect to the I-axis projected onto the Q plane. FIG. 12b shows the same correlation triangle projected onto the I plane. Shown are three noise free sample signal pairs: $(I_1, Q_1)$, $(I_2, Q_2)$ and $(I_3,$ $Q_3$). These signal pairs are used in the triangles to estimate in the least mean square error sense three signal parameters; namely, the signal amplitude A, the RF phase O and the code phase $\phi$ of the peak signal response.

Option 2 For Estimating Signal Code Phase

Option 2 is similar to option 1 previously described, but consists of a non-coherent approach. The input data are the $I_E$, $Q_E$, $I_P$, $Q_P$, and $I_L$, $Q_L$. The input data are scanned over code phase and signal amplitude. Values for the code phase and signal amplitude are chosen which minimize the mean squared error, computed in the envelope domain shown in FIG. 8 and from these values estimates of the code phase and signal amplitude are made.

Although only a single embodiment of the invention has been disclosed with variations, it will be apparent to a person skilled in the art that various modifications to the details of construction shown and described may be made without departing from the scope of this invention.

What is claimed is:

1. A global position system (GPS) receiver comprising:
   (a) a frequency synthesizer means;
   (b) a fixed frequency converter means operatively connected to the frequency synthesizer means for downconverting GPS signals received from a plurality of space vehicles to baseband in-phase (I) and quadrature phase (Q) signals and forming digital words thereof of preselected bit lengths; and
   (c) a signal processor means, said signal processor means including a code generator means, a plurality of space vehicle signal preprocessors and a computer means, the code generation means operatively connected to the frequency synthesizer means for receiving code clocking signals, and each of said plurality of preprocessors operatively connected to the fixed frequency converter means and code generator means for receiving the in-phase and quadrature phase digital words and selectively timed code signals for the in phase and quadrature phase signals of early ($I_E, Q_E$), prompt ($I_P, Q_P$) and late ($I_L, Q_L$) complex responses for one space vehicle for producing early, late and prompt correlation outputs for the computer means, whereby the plurality of space vehicle signal preprocessors operate in the same I.Q base band signals for producing early, prompt and late correlations peculiar to each space vehicle for the computer means, and said computer means operatively connected to the plurality of preprocessors, code generator means and frequency synthesizer means for performing preselected fundamental GPS signal processing functions.

2. The GPS receiver according to claim 1 wherein the frequency synthesizer means includes a frequency synthesizer and the signal processor includes a divide by (n−1),n,(n+1) divider operatively connected to the frequency synthesizer for receiving a timing frequency of the frequency synthesizer and to the computer means for receiving selective increment and decrement signals and to the code generator means, said divider and code generator means operatively connected to the computer means for receiving common initialization signals whereby the divider provides selected code clock signals to the code generator means by providing an operating count of n chip lengths, a divide by (n−1) count at a preselected time epoch to the code generator means to move the code generator means output one count earlier at the timing epoch and a divide by (n+1) count to the code generator means to move the code generator means output one count later at the same timing epoch and wherein n is a position integer.

3. The GPS receiver according to claim 2, wherein the divide by (n−1), n, (n+1) divider is a divide by 1,2,3 divider.

4. The GPS receiver according to claim 1 wherein the fixed frequency converter means includes an in phase, I, channel and a quadrature phase, Q, channel, said channesl each including a mixer for reducing the incoming GPS signals to baseband, a synchronized integrate and dump circuit operatively connected to the mixer for receiving synchronization signals at a preselected clocking rate, and an analog to digital converter operatively connected to the synchronized integrate and dump circuits for digitizing the GPS received signals into in phase I and quadrature phase Q words of a predetermined number of bits in length.

5. The GPS receiver according to claim 1 wherein the code generator means includes a code generator for each of the plurality of preprocessors.

6. The GPS receiver according to claim 1 wherein each preprocessor includes a first, second and third delay means, a first and second plurality of multipliers arranged as sets of I multipliers and Q multipliers, said first and second plurality of multipliers including an early I and Q prompt (I and Q) and late (I and Q) multiplier set connected, respectively, to the fixed frequency converter means for receiving the I and Q digitized words for sampling of the I and Q digitized words and wherein the code generator is connected to the early I and Q multipliers and to the first delay means, said first delay means connected to the I and Q prompt multipliers and to the second delay means, said second delay means connected to the I and Q late multipliers whereby early, prompt and late code phases are created for the first and second plurality of multipliers and a first and second pluralities of I and Q accumulators operatively connected, respectively, to the computer means and to the first and second pluralities of I and Q multipliers for forming $I_E$, $I_P$ and $I_L$ and $Q_E$, $Q_P$ and $Q_L$ sampled signals for the computer means.

7. The GPS receiver according to claim 1, wherein the computer means is connected to I,Q accumulators for performing carrier loop tracking, code loop tracking and signal amplitude estimation.

8. The GPS receiver according to claim 7 wherein the computer means includes a processor having means for obtaining an estimate of code phase and carrier phase and means for minimizing the means square error in the estimation of code phase and carrier phase by the simultaneous searching of code phase, carrier phase and signal amplitude of the received GPS signals.

9. The GPS receiver according to claim 7 wherein the computer means includes a processor having:
   (a) means for interrupting the preprocessor when a preselected sum of N samples of I, Q digital words have been accumulated;
   (b) means for inputting a preselected number each of N samples of I, Q digital words to a resolver means;
   (c) means for performing carrier resolution on the I, Q digital words for producing I' and Q' (despun) signals repeatedly to accumulate a preselected number of I' and Q' signals;

(d) means for estimating code phase using the I' and Q' signals;
(e) means for storing the estimated code phase signals;
(f) means for estimating carrier phase using the I' and Q' signals;
(g) means for storing the estimated carrier phase signals; and
(h) means for performing code master accumulation for determining code phase estimates and for determining control commands for the preprocessor code generator divide by the (n−1), n, (n+1) divider.

10. The GPS receiver according to claim 9 wherein the means for estimating the code phase and carrier phase includes a processor having:
(a) means for finding a preselected number of envelopes, each from an I and, Q pair of correlation responses corresponding in number to preselected code phases;
(b) means for defining a continuous phase/amplitude envelope response including the envelopes of (a) multiplied by a continuous function of code phase;
(c) means for choosing the envelope having the largest amplitude from the continuous envelope response;
(d) means for choosing the larger of the two amplitude responses from the nearest neighbor of the one having the largest amplitude;
(e) means for searching the code phase interval between the two envelope maxima identified in (c) and (d) for the peak of the continuous response defined in (b), said peak phase location constituting the estimate of the code phase;
(f) means for evaluating the I phase peak and the Q phase peak from the phase peak and phases of the correlation responses; and
(g) means for estimating the carrier phase from the Q phase peak and the I phase peak using arctangent 2.

11. The GPS receiver according to claim 1 wherein the computer means includes a resolver means for each space vehicle to be tracked, said resolver means including carrier tracking and code tracking resolvers, each resolver for performing the function of rotating in phase space the input I,Q sample an angular amount for providing despun I' and Q' values for subsequent signal processing.

* * * * *